(12) United States Patent
Park et al.

(10) Patent No.: US 9,405,151 B2
(45) Date of Patent: Aug. 2, 2016

(54) DISPLAY APPARATUS AND METHOD OF DRIVING THE SAME

(75) Inventors: Hae-Il Park, Seoul (KR); Jae-Byung Park, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 195 days.

(21) Appl. No.: 13/560,521

(22) Filed: Jul. 27, 2012

(65) Prior Publication Data

US 2013/0241973 A1  Sep. 19, 2013

(30) Foreign Application Priority Data

Mar. 15, 2012  (KR) .................. 10-2012-0026430

(51) Int. Cl.
| | | |
|---|---|---|
| *G09G 3/10* | (2006.01) | |
| *G09G 5/00* | (2006.01) | |
| *G06F 3/038* | (2013.01) | |
| *G09G 3/06* | (2006.01) | |
| *G09G 5/10* | (2006.01) | |
| *G02F 1/1335* | (2006.01) | |
| *G09G 3/34* | (2006.01) | |

(52) U.S. Cl.
CPC ........ *G02F 1/133617* (2013.01); *G09G 3/3413* (2013.01); *G09G 2310/0235* (2013.01)

(58) Field of Classification Search
CPC ............... G09G 3/3413; G09G 2310/0235; G02F 1/133617
USPC ................ 345/204, 41, 47, 690; 359/227
See application file for complete search history.

(56) References Cited

U.S. PATENT DOCUMENTS

| | | | | |
|---|---|---|---|---|
| 4,678,285 | A  * | 7/1987 | Ohta et al. ................. | 349/71 |
| 8,599,462 | B2 * | 12/2013 | Morita et al. ............... | 359/230 |
| 2004/0036945 | A1* | 2/2004 | Adachi ........................ | 359/245 |
| 2004/0174469 | A1* | 9/2004 | Takagi et al. ................ | 349/57 |
| 2006/0232732 | A1* | 10/2006 | Hwang et al. ............... | 349/115 |
| 2006/0244872 | A1* | 11/2006 | Kim et al. .................... | 349/25 |
| 2007/0013624 | A1* | 1/2007 | Bourhill ...................... | 345/84 |
| 2009/0039375 | A1* | 2/2009 | LeToquin et al. ............ | 257/98 |
| 2010/0134390 | A1 | 6/2010 | Shin et al. | |
| 2011/0025731 | A1* | 2/2011 | Hayashi ...................... | 345/690 |
| 2011/0032246 | A1* | 2/2011 | Hong et al. .................. | 345/214 |

(Continued)

FOREIGN PATENT DOCUMENTS

| | | |
|---|---|---|
| KR | 20100101001 | 9/2010 |
| KR | 1020100120419 | 11/2010 |

*Primary Examiner* — Temesgh Ghebretinsae
*Assistant Examiner* — Benyam Ketema
(74) *Attorney, Agent, or Firm* — H.C. Park & Associates, PLC

(57) ABSTRACT

A display apparatus includes a display panel and a backlight unit. The display panel includes a first substrate and a second substrate. The first substrate includes a first base substrate and a wavelength transforming member. The wavelength transforming member is formed on a first surface of the first base substrate to change a wavelength of light to emit visible light having a predetermined wavelength. The second substrate includes a second base substrate and a light shutter member. The second base substrate faces the first base substrate. The light shutter member is formed on a first surface of the second base substrate facing the first surface of the first base substrate. The light shutter member controls light transmittance of the light received from the wavelength transforming member. The backlight unit provides the display panel with the light. Thus, color purity of image is increased, thereby improving image display quality.

24 Claims, 6 Drawing Sheets

(56) References Cited

U.S. PATENT DOCUMENTS

| | | |
|---|---|---|
| 2011/0069369 A1 | 3/2011 | Park et al. |
| 2011/0096021 A1* | 4/2011 | Kim et al. .................... 345/174 |
| 2011/0267382 A1* | 11/2011 | Fergason et al. ............. 345/690 |
| 2012/0099062 A1* | 4/2012 | Chen et al. ................... 349/115 |

* cited by examiner

DISPLAY APPARATUS AND METHOD OF DRIVING THE SAME

CROSS REFERENCE TO RELATED APPLICATION

This application claims priority from and the benefit of Korean Patent Application No. 10-2012-0026430, filed on Mar. 15, 2012, which is hereby incorporated by reference for all purposes as if fully set forth herein.

BACKGROUND OF THE INVENTION

1. Field of the Invention

Exemplary embodiments of the present invention relate to a display apparatus having improved image display quality and a method of driving the display apparatus.

2. Discussion of the Background

Generally, a display apparatus displays an image based on data provided from an external device. Examples of the display apparatus may be a cathode ray tube (CRT) display apparatus, a liquid crystal display (LCD) apparatus, a plasma display panel (PDP) apparatus, a field emission display (FED) apparatus, and a photo-luminescent display apparatus.

A photo-luminescent liquid crystal display (PL-LCD) apparatus displays an image using fluorescent patterns and an ultraviolet (UV) lamp instead of color filters and a fluorescent lamp. The PL-LCD drives liquid crystals using on/off shutters to display a Red-Green-Blue (RGB) image using light having passed through RGB fluorescent patterns. However, RGB colors may be mixed between adjacent RGB fluorescent patterns so that the color of the image is broken up (i.e., color break up (CBU)).

Also, the UV lamp of the PL-LCD is formed by removing a fluorescent layer from a conventional fluorescent lamp so that light having various frequencies may be mixed. Thus, color purity of the light emitting from the PL-LCD is decreased.

SUMMARY OF THE INVENTION

Exemplary embodiments of the present invention provide a display apparatus capable of improving color purity to improve image display quality and a method of driving the display apparatus.

Additional features of the invention will be set forth in the description which follows, and in part will be apparent from the description, or may be learned by practice of the invention.

Exemplary embodiments of the invention disclose a display apparatus including a display panel and a backlight unit. The display panel includes a first substrate and a second substrate. The first substrate includes a first base substrate and a wavelength transforming member. The wavelength transforming member is formed on a first surface of the first base substrate to change a wavelength of light to emit visible light having a determined wavelength. The second substrate includes a second base substrate and a light shutter member. The second base substrate faces the first base substrate. The light shutter member is formed on a first surface of the second base substrate facing the first surface of the first base substrate. The light shutter member is configured to control light transmittance of the light received from the wavelength transforming member. The backlight unit provides the light.

Exemplary embodiments of the invention also disclose a method of driving a display apparatus including a display panel and a backlight unit. The method includes time-dividing a frame into a plurality of sub frames to time-divide received data into first data, second data, and third data corresponding to the sub frames to provide a data driving part with the first data, the second data, and the third data. The method includes sequentially applying a scan pulse to a plurality of gate lines during a scan period. The scan pulse selects a horizontal line receiving the time-divided data during each of the sub frames. The sub frames correspond to a plurality of sub pixels of the display panel. The plurality of sub pixels includes a first sub pixel, a second sub pixel, and a third sub pixel configured to emit light having different wavelengths. The method includes driving a light shutter member of each of the sub pixels to control light transmittance of the light shutter member, and driving, after the scan period, a first light source of the backlight unit to generate a first light and a second light source of the backlight unit to generate a second light according to each of the time-divided data. The second light has a different wavelength than the first light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE EXEMPLARY EMBODIMENTS

Figure 1:
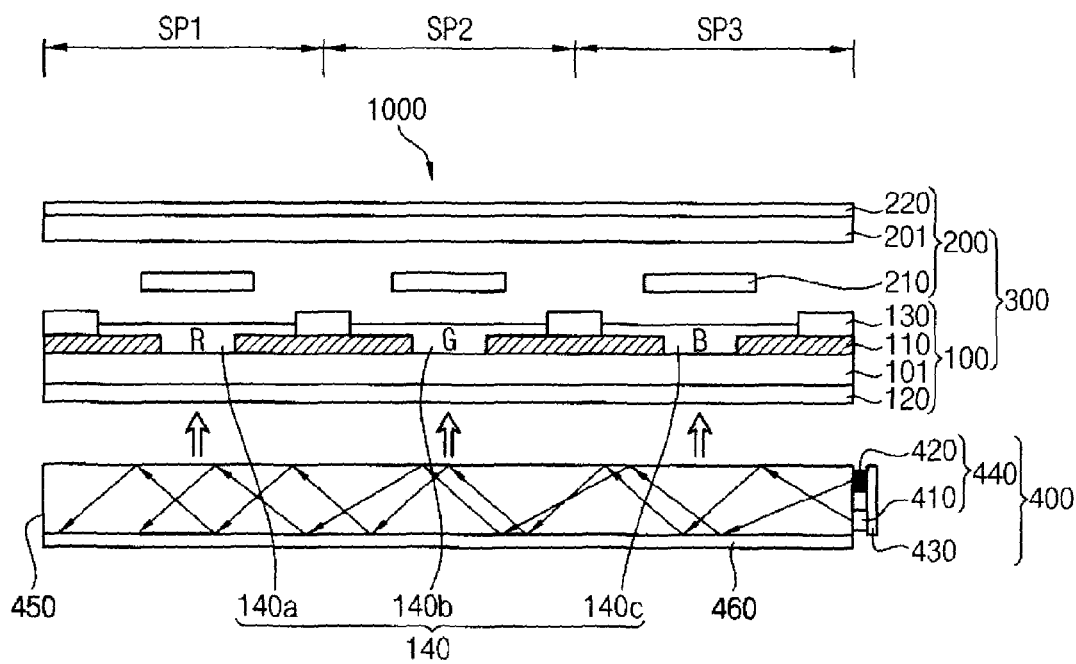
FIG. 1 is a cross-sectional view illustrating a display apparatus according to exemplary embodiments of the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing.

Hereinafter, exemplary embodiments of the present invention will be explained in detail with reference to the accompanying drawings.

FIG. 1 is a cross-sectional view illustrating a display apparatus according to exemplary embodiments of the present invention.

Referring to FIG. 1, the display apparatus 1000 may include a display panel 300 and a backlight unit 400.

The display panel 300 may include a first substrate 100 and a second substrate 200 facing the first substrate 100.

The first substrate 100 may include a first base substrate 101, a light blocking pattern 110, a transflective layer 120, a spacing member 130, and a wavelength transforming member 140.

The first base substrate 101 may include a transparent insulating material.

The light blocking pattern 110 may be formed on the first base substrate 101. The light blocking pattern 110 may absorb light incident to the light blocking pattern 110 through the first substrate 100 to prevent contrast ratio of the display panel 300 from being decreased by unnecessary reflected light. The light blocking pattern 110 may have an opening hole corresponding to a pixel region. Light transmission through the first substrate 100 may pass through the opening hole of the light blocking pattern 110 and be irradiated into the wavelength transforming member 140.

The transflective layer 120 may be formed on a surface of the first base substrate 101 that is opposite to a surface of the first base substrate 101 on which the light blocking pattern 110 is disposed. The transflective layer 120 may pass a blue light and an ultraviolet (UV) light, and reflect a red light and a green light that are visible light. For example, blue light generated from a light source may pass through the transflective layer 120, but a portion of red light and/or green light emitted from the wavelength transforming member 140 may be reflected back toward the wavelength transforming member 140. Thus, luminance of the display panel 300 may be increased.

The blue light may be different from the UV light. For example, wavelength of the UV light may be shorter than the blue light.

In some cases, the transflective layer 120 may have a multilayered structure including cholesteric liquid crystal molecules. In some cases, the transflective layer 120 may have a refractive multilayered structure having various layers with different refractions.

The spacing member 130 is formed on the light blocking pattern 110 of the first base substrate 100. The spacing member 130 defines a plurality of internal spaces in the display panel 300. For example, the spacing member 130 defines first, second, and third sub pixels SP1, SP2, and SP3. The spacing member 130 may be formed using a white dielectric barrier or a barrier coated by a white material. In general, any suitable method may be used to form the spacing member 130. The spacing member 130 may prevent adjacent wavelength transforming members 140 from being mixed, and may reflect a portion of red light, green light, and blue light towards the wavelength transforming members 140. Thus, the luminance of the display panel 300 may be increased.

The wavelength transforming member 140 may excite light incident to the first substrate 100 to generate the red (R), green (G), and blue (B) lights. Light exiting the wavelength transforming member 140 may have a Lambertian distribution. The wavelength transforming member 140 may include first, second, and third wavelength transforming portions 140a, 140b, and 140c, which may be located in the first, second, and third sub pixels SP1, SP2, and SP3, respectively.

The first wavelength transforming portion 140a may be formed in the first sub pixel SP1 in a space between two spacing members 130 and between two light blocking patterns 110. The first wavelength transforming portion 140a may excite light incident to the first substrate 100 to generate red light. The first wavelength transforming portion 140a may include a fluorescent material, a color transforming material, and/or a light emitting material that is a mixture of the fluorescent material and the color transforming material. The fluorescent material may be classified as an inorganic fluorescent material or an organic fluorescent material. An example of the inorganic fluorescent material includes, but is not limited to, $Y_2O_2S:Eu$. An example of the organic fluorescent material includes, but is not limited to, Rhodamine B. The color transforming material may absorb light to transform a color of the light to red light.

The second wavelength transforming portion 140b may be formed in the second sub pixel SP2 in a space between two spacing members 130 and between two light blocking patterns 110. The second wavelength transforming portion 140b may excite light incident to the first substrate 100 to generate green light. The second wavelength transforming portion 140b may include a fluorescent material, a color transforming material, and/or a light emitting material that is a mixture of the fluorescent material and the color transforming material. The fluorescent material may be classified as an inorganic fluorescent material or an organic fluorescent material. Examples of the inorganic fluorescent material include, but are not limited to, $(Sr, Ca, Ba, Eu)_{10}(PO_4)_6 \cdot Cl_2$. An example of the organic fluorescent material includes, but is not limited to, Brilliant Sulfo Flavine FF. The color transforming material may absorb light to transform a color of the light to the green light.

The third wavelength transforming portion 140c may be formed in the third sub pixel SP3 in a space between two spacing members 130 and between two light blocking patterns 110. The third wavelength transforming portion 140c may excite light incident to the first substrate 100 to generate blue light. The third wavelength transforming portion 140c may include a fluorescent material, a color transforming material, and/or a light emitting material that is a mixture of the fluorescent material and the color transforming material. The fluorescent material may be classified as an inorganic fluorescent material or an organic fluorescent material. An example of the inorganic fluorescent material includes, but is not limited to, $3(Ba, Mg, Eu, Mn)O \cdot 8Al_2O_3$. The color transforming material may absorb light to transform a color of the light to blue light.

Concentration of the wavelength transforming material in the first, second, and third wavelength transforming portions 140a, 140b, and 140c may be changed. For example, when the concentration of the wavelength transforming material in the first, second, and third wavelength transforming portions 140a, 140b, and 140c is high, light emitted from the first, second, and third wavelength transforming portions 140a, 140b and 140c may be red, green, and blue lights, respectively. However, when the concentration of the wavelength transforming material in the first, second, and third wavelength transforming portions 140a, 140b, and 140c is low, light emitted from the first, second, and third wavelength transforming portions 140a, 140b, and 140c may be ultraviolet light from the light source as well as red, green, and blue lights, respectively. When light emitted from the first, second, and third wavelength transforming portions 140a, 140b, and 140c includes ultraviolet light, a UV blocking layer 220 may be required. The UV blocking layer 220 will be described in further detail below.

The second substrate 200 may include a second base substrate 201, a driving element (not shown), an insulating layer (not shown), and a shutter assembly (not shown).

The second base substrate 201 may include a transparent insulating material.

The driving element may be formed on the second base substrate 201. The driving element may be electrically connected to data and gate lines (not shown). The driving element drives the shutter assembly. The driving element may include a switching element (not shown) and a capacitor (not shown). The switching element may include a PMOS transistor that may be turned on based on a low level gate signal. It should be understood that various types of transistors and corresponding control signals may be used as a switching element. Furthermore, it should be understood that the switching element is not limited to transistors, and may include any suitable type of electric or electromechanical (e.g., MEMS) component.

The insulating layer is formed on the second base substrate 201 on which the driving element and data and gate lines are formed.

The shutter assembly may be formed on the second base substrate 201 on which the insulating layer is formed. The shutter assembly may include a microelectromechanical systems (MEMS) 210, a first electrode part (not shown), and a second electrode part (not shown). For example, the MEMS 210 may include a digital micro shutter (DMS). The first and second electrode parts (not shown) may be disposed on two sides of the MEMS 210 to horizontally move the MEMS toward a right direction or a left direction of the second base substrate 201. The transportation direction of the MEMS 210 may be substantially parallel with a horizontal direction of the second base substrate 201. The shutter assembly may be formed in a region corresponding to each of the first sub pixel SP1, second sub pixel SP2, and third sub pixel sub pixel SP3 of the unit pixel P. The MEMS 210 may include at least one opening part (not shown). The MEMS 210 opens or closes the opening hole of the light blocking pattern 110. When the opening hole of the light blocking pattern 110 is opened, light emitted from the wavelength transforming member 140 passes through the opening hole. However, when the opening hole of the light blocking pattern 110 is closed, light emitted from the wavelength transforming member 140 is blocked.

The second substrate 200 may further include the UV blocking layer 220. The UV blocking layer 220 may be formed on the second base substrate 201 on which the insulating layer is formed. The UV blocking layer 220 may filter UV light emitted from the light source. In some cases, the UV blocking layer 220 may be omitted from the second substrate 200. For example, in some cases, when concentration of the wavelength transforming material in the first, second, and third wavelength transforming portions 140a, 140b, and 140c is high, red, green, and blue lights may be emitted from the first, second, and third wavelength transforming portions 140a, 140b, and 140c, respectively, and no UV light may be emitted. Accordingly, when light emitted from the first, second and third wavelength transforming portions 140a, 140b and 140c does not include UV light, the UV blocking layer 220 may be omitted.

The display panel 300 may further include an insulating fluid interposed between the first and second substrates 100 and 200. For example, the insulating fluid may include, but is not limited to, oil.

The backlight unit 400 includes a light source part 440, a light guiding plate 450, and a reflecting sheet 460.

The light source part 440 may be a direct-illumination type source. The light source part 440 may be disposed on one side of the light guiding plate 450 to provide the light guiding plate 450 with light. The light source part 440 may include a first light source 410, a second light source 420, and a printed circuit board 430.

The first light source 410 may be mounted on the printed circuit board 430. The first light source 410 may include a plurality of light emitting diodes (LEDs). For example, the first light source 410 may include an n-UV light emitting diode (n_UV_LED) emitting a UV light having wavelength similar to visible light, and/or a white LED emitting a white light. The first light source 410 may emit a light having a peak wavelength of about 300 nm to about 400 nm. The first, second, and third wavelength transforming portions 140a, 140b, and 140c may emit red (R), green (G), and blue (B) lights using the light emitted from the first light source 410, respectively.

The second light source 420 may be mounted on the printed circuit board 430, and may be disposed adjacent to the first light source 410. The second light source 420 may include a plurality of light emitting diodes (LEDs). For example, the second light source 420 may include a blue light emitting diode (BLUE_LED) to emit a blue light. The second light source 420 may emit a blue light having a peak wavelength of about 400 nm to about 500 nm. The first, second, and third wavelength transforming portions 140a, 140b, and 140c may emit red (R), green (G), and blue (B) lights, respectively, using the light emitted from the second light source 420. When blue (B) light is generated from the UV light, energy loss may occur during the wavelength transforming. However, according to exemplary embodiments of the invention, blue (B) light is generated from the light generated from the second light source 420 so that luminance of the display apparatus 1000 may be increased. The operation of the light source part 440 will be explained later. In general, any suitable light source may be used for the first light source 410 and the second light source 420.

The printed circuit board 430 may be arranged in a longitudinal direction of the first and second light sources 410 and 420. The printed circuit board 430 may be electrically connected to the light source driving part 530 (shown in FIG. 3) to drive the light source part 440.

The light guiding plate 450 may be disposed under the transflective layer 120 of the display panel 300. The light guiding plate 450 may have a plate shape to guide the light emitted from the light source part 440 toward the first substrate 100. The light guiding plate 450 may have a light incident surface to receive the light generated from the light sources 410 and 420, and a light exiting surface to guide the light exiting from the light guiding plate 450 towards the display panel 300.

The reflecting sheet 460 may be disposed under the light guiding plate 450. The reflecting sheet 460 may reflect a light leaking from a lower surface of the light guiding plate 450 toward the light guiding plate 450. Thus, luminance of the display apparatus may be increased.

The operation of the display panel 300 and the backlight unit 400 will be explained with reference to FIGS. 2A, 2B, and 2C.

Figure 2A:
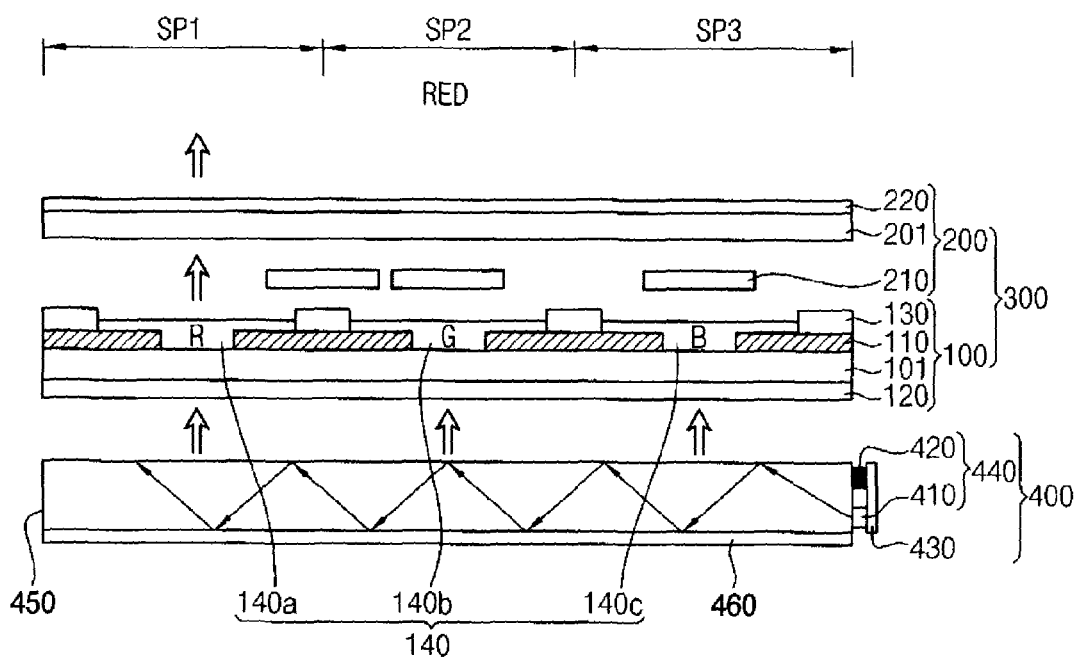
FIGS. 2A, 2B, and 2C are cross-sectional views illustrating an operation of the display apparatus shown in FIG. 1 according to exemplary embodiments of the invention.
Figure 2B:
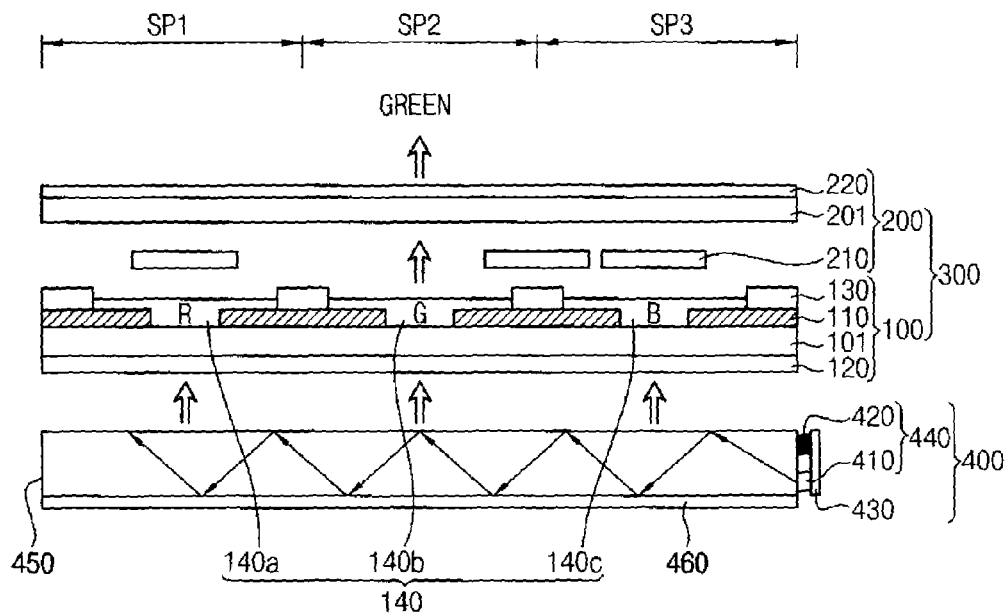
Figure 2C:
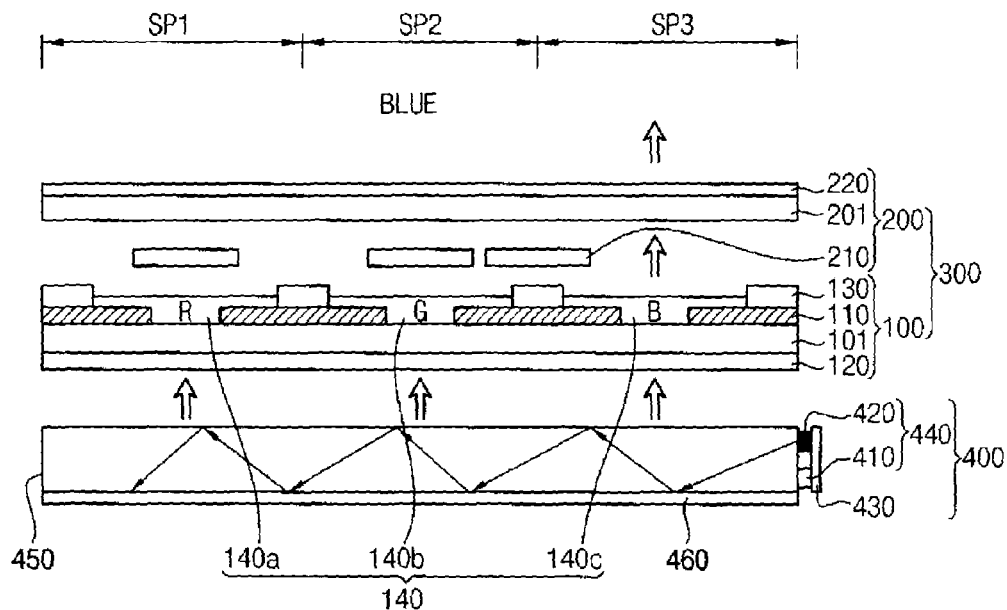

FIGS. 2A, 2B, and 2C are cross-sectional views illustrating operations of the display apparatus shown in FIG. 1.

Referring to FIGS. 1 and 2A, the display apparatus 1000 may display a red (R) image of RGB image. For example, the display apparatus 1000 may receive an RGB image signal. The shutter assembly corresponding to the first sub pixel SP1 may move the MEMS 210 in the horizontal direction substantially parallel to the second base substrate 201 to open the opening hole of the light blocking pattern 110 corresponding to the first sub pixel SP1 during the first sub frame SF1 for displaying the red (R) image. However, the shutter assemblies corresponding to the second and third sub pixels SP2 and SP3 do not move during the first sub frame SF1 and close the opening holes of the light blocking pattern 110 corresponding to the second and third sub pixels SP2 and SP3.

The first light source 410 of the light source part 440 may be illuminated during the first sub frame SF1 to provide the one side of the light guiding plate 450 with the light. The light guiding plate 450 may guide the light generated from the first light source 410 toward the first substrate 100. The light having passed through the first substrate 100 may be irradiated to the wavelength transforming member 140. The wavelength transforming member 140 may emit red (R), green (G), and blue (B) lights using the irradiated light.

The red (R) light may exit from the display panel 300 according to the operations of the shutter assemblies in the first, second, and third sub pixels SP1, SP2, and SP3, and the green (G) and blue (B) lights may be blocked by the MEMS 210. Thus, the red (R) image may be displayed.

Referring to FIGS. 1 and 2B, the display apparatus 1000 may display a green (G) image of RGB image. For example, the display apparatus 1000 may receive an RGB image signal. The shutter assembly corresponding to the second sub pixel SP2 may move the MEMS 210 in the horizontal direction substantially parallel to the second base substrate 201 to open the opening hole of the light blocking pattern 110 corresponding to the second sub pixel SP2 during the second sub frame SF2 for displaying the green (G) image. However, the shutter assemblies corresponding to the first and third sub pixels SP1 and SP3 do not move during the second sub frame SF2 and close the opening holes of the light blocking pattern 110 corresponding to the first and third sub pixels SP1 and SP3.

The first light source 410 of the light source part 440 may be illuminated during the second sub frame SF2 to provide the one side of the light guiding plate 450 with light. The light guiding plate 450 may guide the light generated from the first light source 410 toward the first substrate 100. The light having passed through the first substrate 100 may be irradiated to the wavelength transforming member 140. The wavelength transforming member 140 may emit red (R), green (G), and blue (B) lights using the irradiated light.

The green (G) light may exit from the display panel 300 according to the operations of the shutter assemblies in the first, second, and third sub pixels SP1, SP2, and SP3, and the red (R) and blue (B) lights may be blocked by the MEMS 210. Thus, the green (G) image may be displayed.

Referring to FIGS. 1 and 2C, the display apparatus 1000 may display a blue (B) image of RGB image. For example, the display apparatus 1000 may receive an RGB image signal. The shutter assembly corresponding to the third sub pixel SP3 may move the MEMS 210 in the horizontal direction substantially parallel to the second base substrate 201 to open the opening hole of the light blocking pattern 110 corresponding to the third sub pixel SP3 during the third sub frame SF3 for displaying the blue (B) image. However, the shutter assemblies corresponding to the first and second sub pixels SP1 and SP2 do not move during the third sub frame SF3 and close the opening holes of the light blocking pattern 110 corresponding to the first and second sub pixels SP1 and SP2.

The second light source 420 of the light source part 440 may be illuminated during the third sub frame SF3 to provide the one side of the light guiding plate 450 with light. The light guiding plate 450 may guide the light generated from the second light source 420 toward the first substrate 100. The light having passed through the first substrate 100 may be irradiated to the wavelength transforming member 140. The wavelength transforming member 140 may emit red (R), green (G), and blue (B) lights using the irradiated light.

The blue (B) light may exit from the display panel 300 according to the operation of the shutter assemblies in the first, second, and third sub pixels SP1, SP2, and SP3, and the red (R) and green (G) lights may be blocked by the MEMS 210. Thus, the blue (B) image may be displayed.

The display apparatus 1000 may divide one frame into first, second, and third sub frames to sequentially display the red (R), green (G), and blue (B) images during the first, second, and third sub frames. Also, the red (R) and green (G) images of the RGB image may be displayed using the first light source 410. The blue (B) image of the RGB image may be displayed using the second light source 420. Thus, the luminance of the display apparatus 1000 may be improved. Also, the red (R), green (G), and blue (B) images may be displayed according to a time-division method, and a color break up (CBU) that can be caused by mixing different color images is decreased.

In some cases, one frame may be divided in various sub frames, and the image may be divided into various sub images that are different from the red (R), green (G), and blue (B) images.

An operation of the display apparatus 1000 will be explained with reference to FIGS. 3, 4, and 5.

Figure 3:
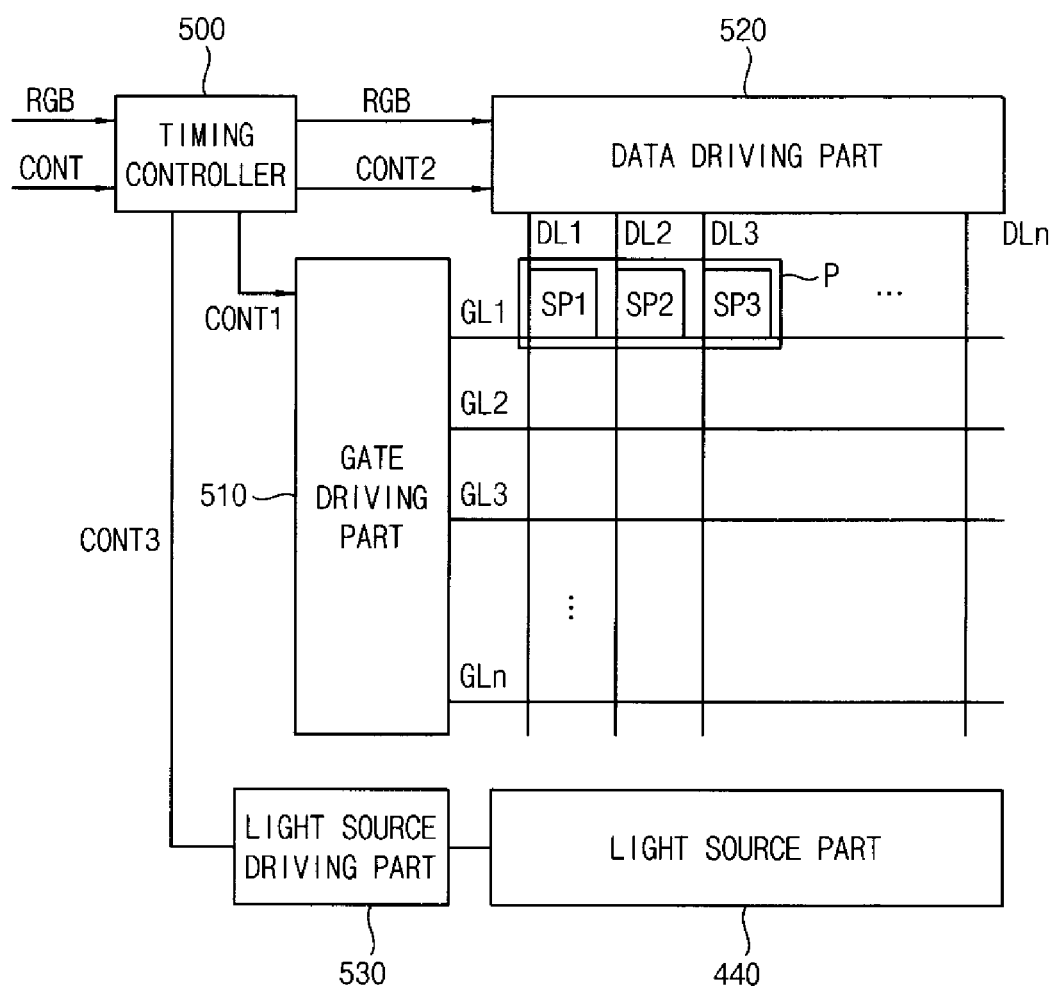
FIG. 3 is a block diagram illustrating an operation of the display apparatus shown in FIG. 1 according to exemplary embodiments of the invention.

FIG. 3 is a block diagram illustrating an operation of the display apparatus 1000 shown in FIG. 1. FIG. 4 is a timing diagram illustrating an operation of the display apparatus 1000 shown in FIG. 1.

Figure 4:
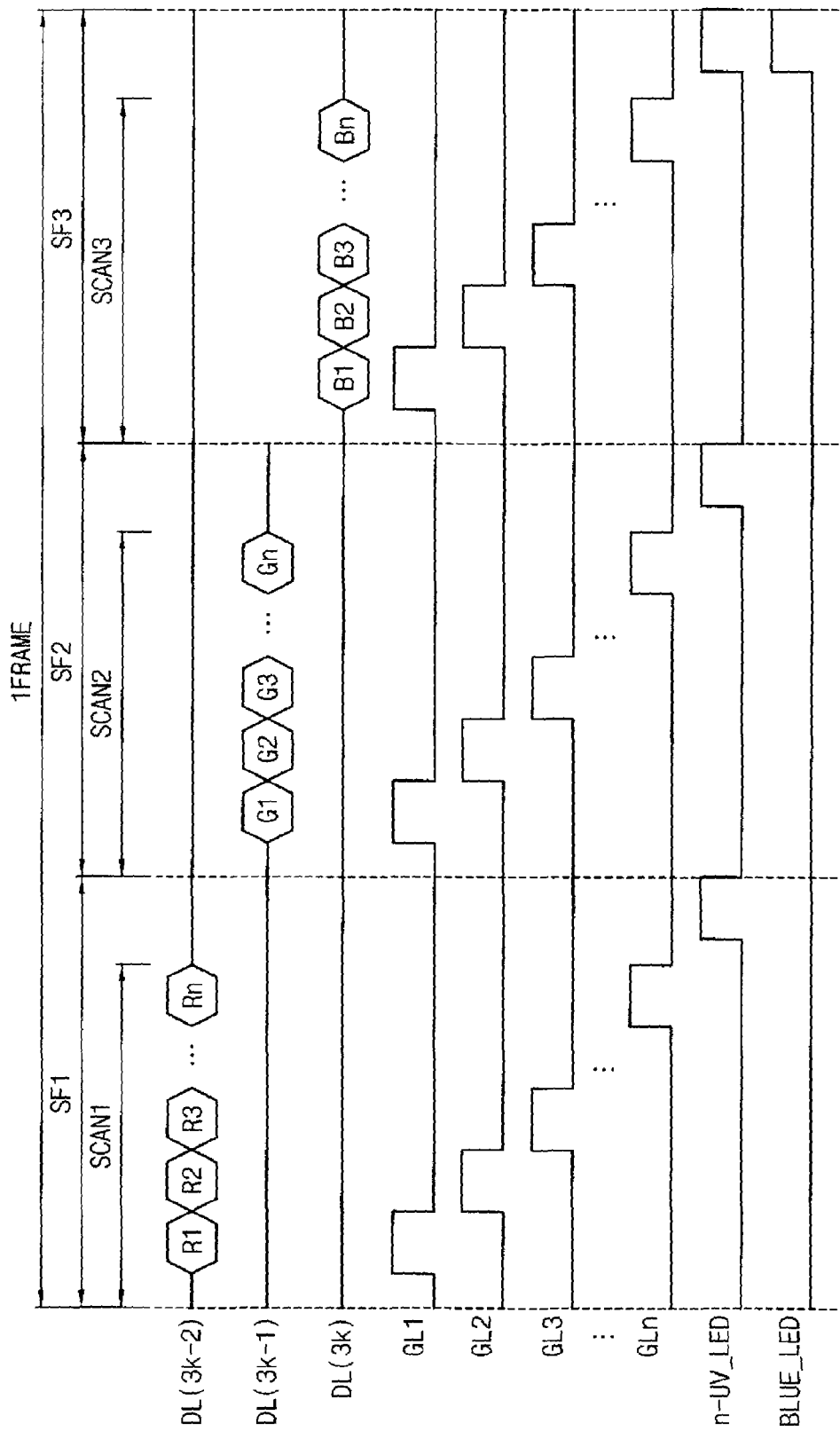
FIG. 4 is a timing diagram illustrating an operation of the display apparatus shown in FIG. 1 according to exemplary embodiments of the invention.

Referring to FIGS. 3 and 4, the display apparatus 1000 may include a plurality of data lines DL1, ... DLn (n is any whole number greater than 1), a plurality of gate lines GL1, ... GLm (m is any whole number greater than 1), a timing controller 500, a gate driving part 510, a data driving part 520, a light source driving part 530.

The data lines DL1, ... DLn and the gate lines GL1, ... GLm are formed on the second base substrate 201, and may cross each other. The first, second, and third sub pixels SP1, SP2, and SP3 displaying different colors from each other may be formed in each region by data lines DL1, ..., DLn and gate lines GL1, ... GLm crossing each other. Each unit pixel P may include the first, second, and third sub pixels SP1, SP2, and SP3, and may display different colors. For example, the first, second, and third sub pixels SP1, SP2, and SP3 may be arranged in sequence along a direction in which the gate lines are extended. The first, second, and third sub pixels SP1, SP2, and SP3 may correspond to the spacing members 130 formed on the first base substrate 101. For example, the first, second, and third sub pixels SP1, SP2, and SP3 may be disposed adjacent to a region in which the first data line DL1 crosses the first gate line GL1, a region in which the second data line DL2 crosses the first gate line GL1, and a region in which the second data line DL2 crosses the first gate line GL1.

The timing controller 500 may generate a gate driving signal CONT1, a data driving signal CONT2, and a light source driving signal CONT3 based on an externally provided driving control signal CONT to control timing of the gate driving part 510, the data driving part 520, and the light source driving part 530. The timing controller 500 may time-divide the RGB data into the first, second, and third sub frames to apply the time-divided RGB data to the data driving part 520.

For example, the timing controller 500 may time-divide one frame into three sub frames SF1, SF2, and SF3, and time-divide the three sub frames SF1, SF2 and SF3 into scan periods SCAN1, SCAN2, and SCAN3, respectively. For example, the sub frames SF1, SF2, and SF3 may include the scan periods SCAN1, SCAN2, and SCAN3, respectively. The timing controller 500 may apply the red (R) data to the data driving part 520 during the scan period SCAN1 of the first sub frame SF1; may also apply the green (G) data to the data driving part 520 during the scan period SCAN2 of the second sub frame SF2; and may apply the blue (B) data to the data driving part 520 during the scan period SCAN3 of the third sub frame SF3.

An image of the one frame 1FRAME may be displayed using a first sub image displayed by the red (R) data during the first sub frame SF1, a second sub image displayed by the green (G) data during the second sub frame SF2, and a third sub image displayed by the blue (B) data during the third sub frame SF3.

The gate driving part 510 may receive the gate driving signal CONT1 from the timing controller 500 to apply scan pluses for selecting horizontal lines to the gate lines GL1, ... GLm based on the gate driving signal CONT1 during the scan periods SCAN1, SCAN2, and SCAN3 of the sub frames SF1, SF2, and SF3.

The data driving part 520 may receive the data driving signal CONT2 from the timing controller 500. The data driving part 520 may convert the red (R), green (G), and blue (B) data into analog image signals to apply the analog image signals to the data lines DL($3k-2$), DL($3k-1$) and DL($3k$) (k is any whole number greater than or equal to 1) based on the data driving signal CONT2 during the scan periods SCAN1, SCAN2, and SCAN3 of the sub frames SF1, SF2, and SF3. For example, the data driving part 520 may apply the analog image signal corresponding to the red (R) data to the data line DL($3k-2$) during the first sub frame SF1; may apply the analog image signal corresponding to the green (G) data to the data line DL($3k-1$) during the second sub frame SF2; and may apply the analog image signal corresponding to the blue (B) data to the data line DL($3k$) during the third sub frame SF3.

The light source driving part 530 may receive the light source driving signal CONT3 from the timing controller 500. The light source driving part 530 may drive the light source part 440 based on the light source driving signal CONT3. For example, on/off timing of the first and second light sources 410 and 420 of the light source part 440 may be differentially set during the first, second, and third sub frames SF1, SF2, and SF3. The first light source 410 may be illuminated after scan periods SCAN1 and SCAN2 of first and second sub frames SF1 and SF2 based on the control of the light source driving part 530. Thus, the display panel 300 may display red (R) and green (G) images using the first light source 410. The second light source 420 may be illuminated after the scan period SCAN3 of the third sub frame SF3 based on the control of the light source driving part 530. Thus, the display panel 300 may display a blue (B) image using the second light source 420.

According to exemplary embodiments of the invention, the display apparatus 1000 may include the second light source 420 generating a blue light B so that luminance of the display apparatus 1000 can be increased. The red (R), green (G), and blue (B) images may be displayed using the time-division method so that color mixing of the images may be decreased, thereby preventing color break up (CBU).

Figure 5:
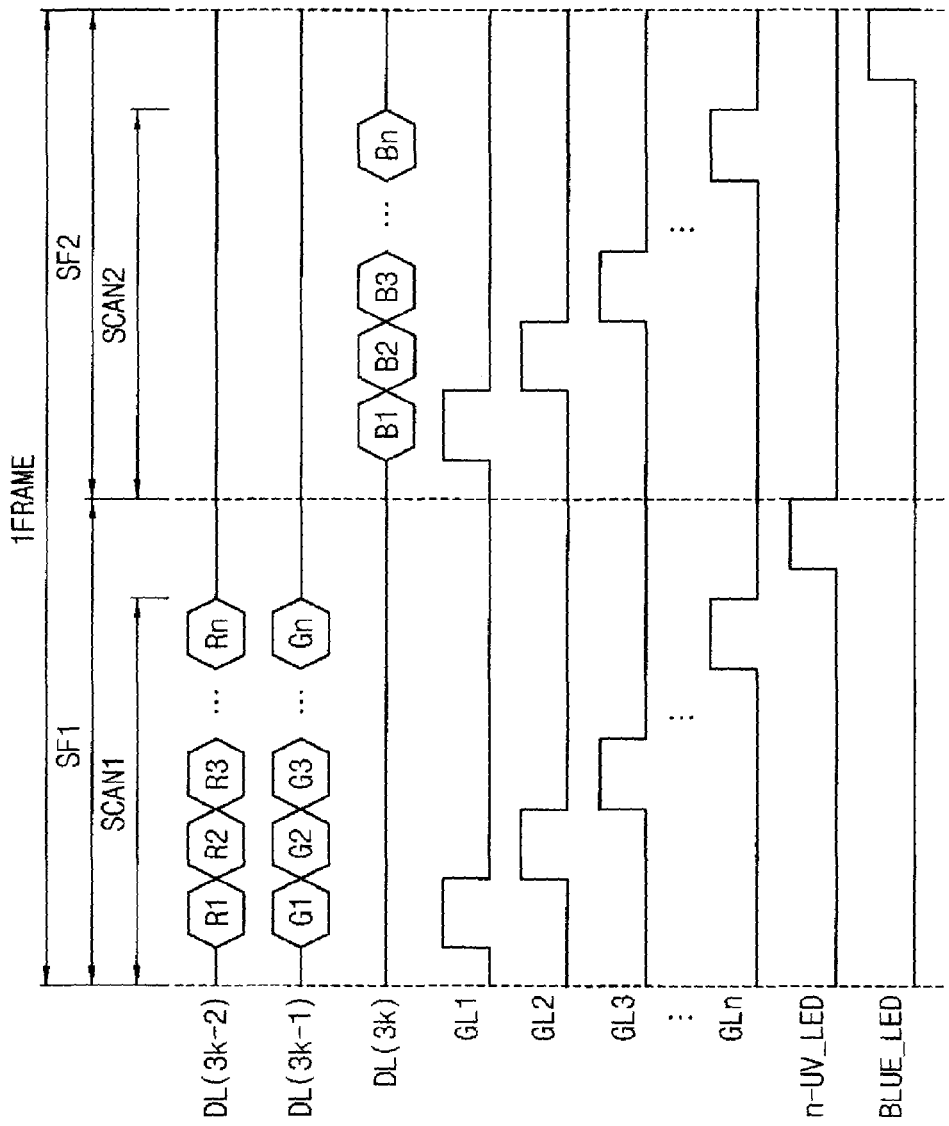
FIG. 5 is a timing diagram illustrating an operation of the display apparatus shown in FIG. 1 according to exemplary embodiments of the invention.

FIG. 5 is a timing diagram illustrating an operation of the display apparatus 1000 shown in FIG. 1 according to exemplary embodiments of the invention.

The operation of the display apparatus of FIG. 5 is substantially the same as the display apparatus of FIGS. 1, 2A, 2B, 2C, 3 and 4 except that one frame may be divided into first and second sub frames SF1 and SF2. The same reference numerals will be used to refer to the same or like parts as those described with reference to FIGS. 1, 2A, 2B, 2C, 3 and 4, and any repetitive explanation concerning the above elements will be omitted.

Referring to FIGS. 3 and 5, the timing controller 500 may generate a gate driving signal CONT1, a data driving signal CONT2, and a light source driving signal CONT3 based on an externally provided driving control signal CONT to control timing of the gate driving part 510, the data driving part 520, and the light source driving part 530. Also, the timing controller 500 may time-divide RGB data into the first and second sub frames to apply the time-divided RGB data to the data driving part 520.

For example, the timing controller 500 may time-divide one frame into two sub frames SF1 and SF2, and time-divide the two sub frames SF1 and SF2 into scan periods SCAN1 and SCAN2, respectively. For example, the sub frames SF1 and SF2 may include the scan periods SCAN1 and SCAN2, respectively. The timing controller 500 may apply the red (R) and green (G) data to the data driving part 520 during the scan period SCAN1 of the first sub frame SF1. The timing controller 500 may also apply the blue (B) data to the data driving part 520 during the scan period SCAN2 of the second sub frame SF3. The red (R) and green (G) data may be applied to the data driving part 520 through different data buses.

An image of the one frame 1FRAME may be displayed using a first sub image displayed by the red (R) and green (G) data during the first sub frame SF1 and a second sub image displayed by the blue (B) data during the second sub frame SF2.

The gate driving part 510 may receive the gate driving signal CONT1 from the timing controller 500 to apply scan pluses for selecting horizontal lines to the gate lines GL1, . . . . GLm based on the gate driving signal CONT1 during the scan periods SCAN1 and SCAN2 of the sub frames SF1 and SF2.

The data driving part 520 may receive the data driving signal CONT2 from the timing controller 500. The data driving part 520 may convert the red (R), green (G), and blue (B) data into analog image signals to apply the analog image signals to the data lines DL(3$k$–2), DL(3$k$–1), and DL(3$k$) based on the data driving signal CONT2 during the scan periods SCAN1 and SCAN2 of the sub frames SF1 and SF2. For example, the data driving part 520 may apply the analog image signal corresponding to the red (R) and green (G) data to the data lines DL(3$k$–2) and DL(3$k$–1) during the first sub frame SF1. The data driving part 520 may apply the analog image signal corresponding to the blue (B) data to the data line DL(3$k$) during the second sub frame SF2.

The light source driving part 530 may receive the light source driving signal CONT3 from the timing controller 500. The light source driving part 530 may drive the light source part 440 based on the light source driving signal CONT3. For example, on/off timing of the first and second light sources 410 and 420 of the light source part 440 may be differentially set during the first and second sub frames SF1 and SF2. The first light source 410 may be illuminated after the scan period SCAN1 of the first sub frames SF1 based on the control of the light source driving part 530. Thus, the display panel 300 displays the red (R) and green (G) images using the first light source 410. The second light source 420 may be illuminated after the scan period SCAN2 of the second sub frame SF2 based on the control of the light source driving part 530. Thus, the display panel 300 may display the blue (B) image using the second light source 420.

According to the exemplary embodiments of the invention, the display apparatus 1000 may include the second light source 420 for generating a blue light B so that luminance of the display apparatus 1000 can be increased. The red (R), green (G) and blue (B) images may be displayed using the time-division method so that color mixing of the images may be decreased, thereby preventing color break up (CBU). Also, a driving margin may be improved.

Figure 6:
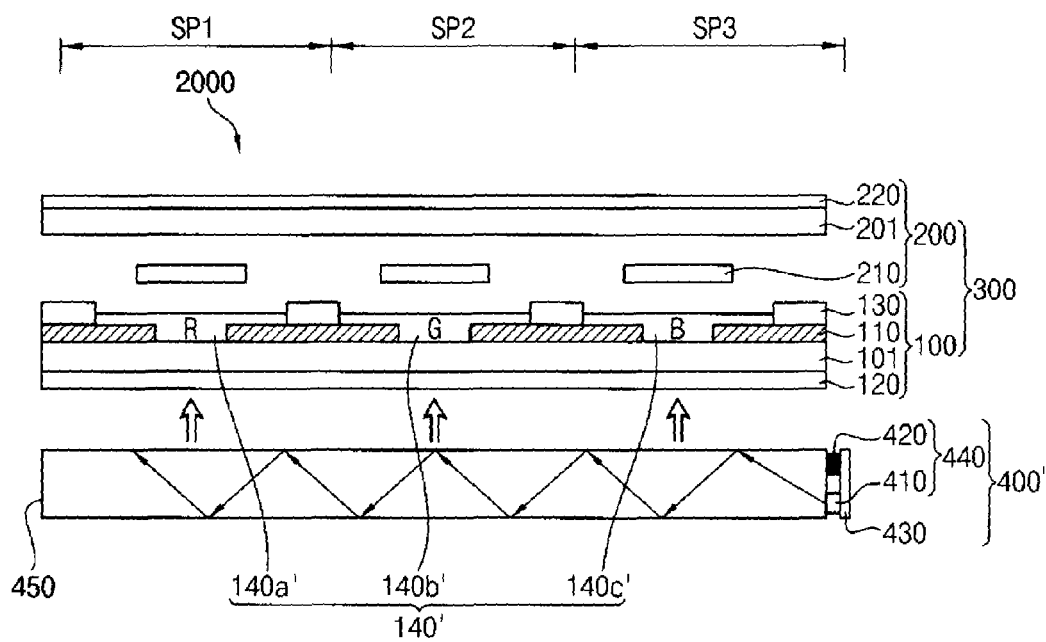
FIG. 6 is a cross-sectional view illustrating a display apparatus according to exemplary embodiments of the present invention.

FIG. 6 is a cross-sectional view illustrating a display apparatus according to exemplary embodiments of the present invention.

The display apparatus 2000 of FIG. 6 may have a transparent display state. For example, when the display apparatus 2000 is turned off, the display apparatus 2000 may transmit external light to be in a transparent display state. When the display apparatus 2000 is turned on, the display apparatus 2000 may display an image using the external light.

The display apparatus 2000 of FIG. 6 may be substantially the same as the display apparatus shown in FIGS. 1, 2A, 2B, 2C, 3, and 4 except the display apparatus 2000 may have a transparent display state. The same reference numerals in FIG. 6 will be used to refer to the same or like parts as those described with reference to FIGS. 1, 2A, 2B, 2C, 3, and 4 and any repetitive explanation concerning these parts will be omitted.

Referring to FIG. 6, the display apparatus 2000 may include a display panel 300 and a backlight unit 400'.

The display panel 300 may include a first substrate 100 and a second substrate 200 facing the first substrate 100.

The first substrate 100 may include a first base substrate 101, a light blocking pattern 110, a transflective layer 120, a spacing member 130, a wavelength transforming member 140', and an ultraviolet (UV) blocking layer 220.

The wavelength transforming member 140' may excite light, which is incident to the first substrate 100, to generate the red (R), green (G), and blue (B) lights. The light exiting the wavelength transforming member 140' may have a Lambertian distribution. The wavelength transforming member 140' may include first, second, and third wavelength transforming portions 140$a$', 140$b$', and 140$c$'.

The first wavelength transforming portion 140$a$' may be formed in a space corresponding to the first sub pixel SP1 between two spacing members 130 and/or between two light blocking patterns. The first wavelength transforming portion 140$a$' may excite light, which is incident to the first substrate 100, to generate red light. The first wavelength transforming portion 140$a$' may include a fluorescent material, a color transforming material, and/or a light emitting material that is a mixture of the fluorescent material and the color transforming material. For example, the fluorescent material may be classified as an inorganic fluorescent material or an organic fluorescent material. An example of the inorganic fluorescent material includes, but is not limited to, Y2O2S:Eu. An example of the organic fluorescent material includes, but is not limited to, Rhodamine B. The color transforming material may absorb light to transform a color of the light to red light.

The second wavelength transforming portion 140$b$' may be formed in a space corresponding to the second sub pixel SP2 formed between two spacing members 130 and/or between two light blocking patterns. The second wavelength transforming portion 140$b$' may excite light incident to the first substrate 100 to generate green light. The second wavelength transforming portion 140$b$' may include a fluorescent material, a color transforming material, and/or a light emitting material that is a mixture of the fluorescent material and the color transforming material. For example, the fluorescent material may be classified as an inorganic fluorescent material and an organic fluorescent material. An example of the inorganic fluorescent material includes, but is not limited to, (Sr, Ca, Ba, Eu)10(PO4)6.Cl2. An example of the organic fluorescent material includes, but is not limited to, Brilliant Sulfo Flavine FF. The color transforming material may absorb light to transform a color of the light to green light.

The third wavelength transforming portion 140$c$' may be formed in a space corresponding to the third sub pixel SP3 between two spacing members 130 and/or between two light blocking patterns. The third wavelength transforming portion 140$c$' may excite light incident to the first substrate 100 to generate blue light. The third wavelength transforming portion 140$c$' may include a fluorescent material, a color transforming material, and/or a light emitting material that is a mixture of the fluorescent material and the color transforming material. For example, the fluorescent material may be classified into an inorganic fluorescent material and an organic fluorescent material. An example of the inorganic fluorescent material includes, but is not limited to, 3(Ba, Mg, Eu, Mn)O.8Al2O3. The color transforming material may absorb light to transform a color of the light to blue light.

In some cases, concentration of the wavelength transforming material in the first, second, and third wavelength transforming portions 140a', 140b', and 140c' may be less than the wavelength transforming material in the first, second, and third wavelength transforming portions 140a, 140b and 140c shown in FIG. 1. When the concentration of the wavelength transforming material in the first, second, and third wavelength transforming portions 140a', 140b', and 140c' is low, visible light may pass through the first, second, and third wavelength transforming portions 140a', 140b', and 140c'. Thus, the display apparatus 2000 may have a transparent display state when the display apparatus 2000 is turned off. In some cases, when light emitted from the first, second, and third wavelength transforming portions 140a', 140b', and 140c' includes ultraviolet light, a UV blocking layer 220 may be required.

The backlight unit 400' may include a light source part 440 and a light guiding plate 450.

The light guiding plate 450 may be disposed under the first substrate 100 of the display panel 300. The light guiding plate 420 may have a plate shape. The light guiding plate 420 may guide light exiting the light source part 440 toward the first substrate 100.

The backlight unit 400' does not include the reflecting sheet 460 shown in FIG. 1. Thus, the display apparatus 2000 may have a transparent display state to transmit the light.

The operation of the display apparatus 2000 of FIG. 6 is substantially the same as the display apparatus of FIGS. 1, 2A, 2B, 2C, 3, 4, and 5. Thus, any repetitive explanations concerning the operation of the display apparatus 2000 may be omitted.

Figure 7:
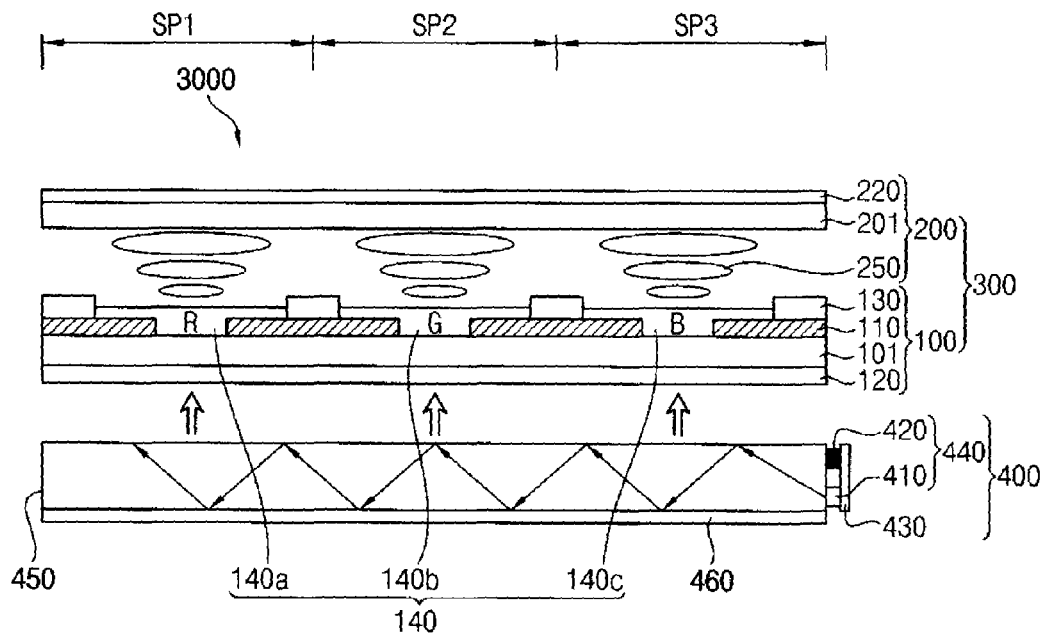
FIG. 7 is a cross-sectional view illustrating a display apparatus according to exemplary embodiments of the present invention.

FIG. 7 is a cross-sectional view illustrating a display apparatus according to exemplary embodiments of the present invention.

The display apparatus 3000 of FIG. 7 is substantially the same as the display apparatus described with reference to FIG. 1 except for inclusion of liquid crystals. The same reference numerals will be used to refer to the same or like parts as those described with reference to FIG. 1 and any repetitive explanation concerning the above parts will be omitted.

Referring to FIG. 7, the display apparatus 3000 may include a display panel 300 and a backlight assembly 400.

The display panel 300 may include a first substrate 100, a second substrate 200, and a liquid crystal layer 250. The first substrate 100 may include a plurality of pixel electrodes. The second substrate 200 faces the first substrate 100. The liquid crystal layer 250 is interposed between the first and second substrates 100 and 200.

The first and second substrates 100 and 200 may include a transparent insulating material.

The second substrate 200 may include a second base substrate 201 and a common electrode (not shown).

The second base substrate 201 may include a transparent insulating layer.

The common electrode may correspond to the pixel electrodes of the first substrate 100. Liquid crystal molecules of the liquid crystal layer 250 may be driven by an electric field applied between the pixel electrodes and the common electrodes. The pixel electrodes, the liquid crystal layer, and the common electrode may be liquid crystal display elements.

The display apparatus 3000 of FIG. 7 may transmit and block light having passed through wavelength transforming member 140 using the liquid crystal display elements instead of the microelectromechanical system (MEMS) of FIG. 1, and may display red (R), green (G), and blue (B) images.

For example, when a red (R) image of the RGB image is displayed, an electric field may be formed between the common electrode and a pixel electrode corresponding to a first sub pixel SP1 to operate liquid crystal molecules of the liquid crystal layer 250 corresponding to the first sub pixel SP1. Thus, red (R) light having passed through the first wavelength transforming member 140a may exit the display panel 300 to display the red (R) image. However, electric fields may not be formed between the common electrodes and the pixel electrodes corresponding to second and third sub pixels SP2 and SP3 to block the green (G) and blue (B) lights. Thus, only the red (R) image may be displayed.

When a green (G) image of the RGB image is displayed, an electric field may be formed between the common electrode and the pixel electrode corresponding to the second sub pixel SP2 to operate liquid crystal molecules of the liquid crystal layer 250 corresponding to the second sub pixel SP2. Thus, green (G) light having passed through the second wavelength transforming member 140b may exit the display panel 300 to display the green (G) image. However, electric fields may not be formed between the common electrodes and pixel electrodes corresponding to first and third sub pixels SP1 and SP3 to block the red (R) and blue (B) lights. Thus, only the green (G) image may be displayed.

When a blue (B) image of the RGB image is displayed, an electric field may be formed between the common electrode and the pixel electrode corresponding to the third sub pixel SP3 to operate liquid crystal molecules of the liquid crystal layer 250 corresponding to the third sub pixel SP3. Thus, blue (B) light having passed through the third wavelength transforming member 140c may exit the display panel 300 to display the blue (B) image. However, electric fields may not be formed between the common electrodes and pixel electrodes corresponding to first and second sub pixels SP1 and SP2 to block the red (R) and green (G) lights. Thus, only the blue (B) image may be displayed.

The operation of the display apparatus 3000 of FIG. 7 is substantially the same as the operation of the display apparatus shown in FIGS. 1, 2A, 2B, 2C, 3, 4, and 5. Thus, any further repetitive explanations will be omitted.

In the above-mentioned embodiments, the display apparatus includes an additional light source as the backlight. However, the wavelength transforming members may be omitted, and the display apparatus may include active light sources such as light emitting diodes and organic light emitting diodes (OLED). The light shutter member may include various elements such as electrophoretic display elements and piezoelectric display elements.

According to exemplary embodiments of the invention, the unit pixel may be divided into a first sub pixel, a second sub pixel, and a third sub pixel. The wavelength transforming member that transforms the wavelength of each of the red, green and blue lights may be formed on each of the sub pixels, thereby spatially dividing the RGB images. A frame may be divided into two or three sub-frames by time-division. Thus, each of the red, green, and blue images may be displayed on each of the sub-frames. Therefore, color purity of the display image may be improved, so that image display quality is improved.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display apparatus, comprising:
   a backlight unit configured to provide light, the back light unit comprising a first light source and a second light source; and
   a display panel comprising:
      a first substrate comprising a first base substrate, a transflective layer, and a wavelength transforming member, the wavelength transforming member being formed on a first surface of the first base substrate to change a wavelength of the provided light to emit the provided light having a determined wavelength; and
      a second substrate comprising a second base substrate and a light shutter member, the second base substrate facing the first base substrate, the light shutter member being disposed between a first surface of the second base substrate and the first surface of the first base substrate, the light shutter member being configured to control light transmittance of the provided light received from the wavelength transforming member,
   wherein the wavelength transforming member further comprises:
      a first wavelength transforming member to transform the wavelength of the provided light to emit a first light;
      a second wavelength transforming member to transform the wavelength of the provided light to emit a second light; and
      a third wavelength transforming member to transform the wavelength of the provided light to emit a third light,
   wherein the first light source is configured to radiate light having a peak wavelength of about 300 nm to about 400 nm and the second light source is configured to be turned off in association with control of the light shutter member to transmit either the first light or the second light,
   wherein the second light source is configured to radiate blue light and the first light source is configured to be turned off in association with control of the light shutter member to transmit the third light, and
   wherein the transflective layer is disposed on a second surface of the first base substrate, the second surface of the first base substrate being opposite to the first surface of the first base substrate, and the transflective layer being configured to pass an ultraviolet light and blue light of the provided light and to reflect red light and green light from the wavelength transforming member.

2. The display apparatus of claim 1, wherein the light shutter member comprises a liquid crystal element.

3. The display apparatus of claim 1, wherein the light shutter member comprises a microelectromechanical system (MEMS).

4. The display apparatus of claim 1, wherein the first substrate further comprises:
   a light blocking pattern formed on the first surface of the first base substrate, the light blocking pattern comprising an opening hole; and
   a spacing member formed on the light blocking pattern to form a space to dispose the wavelength transforming member.

5. The display apparatus of claim 1, wherein the wavelength transforming member comprises at least one material selected from the group consisting of a fluorescent material and a color transforming material.

6. The display apparatus of claim 1, wherein the second substrate further comprises an ultraviolet light blocking layer on a second surface of the second base substrate, the second surface being opposite to the first surface of the second base substrate, and the ultraviolet light blocking layer being configured to absorb an ultraviolet light.

7. The display apparatus of claim 1, wherein the first and second wavelength transforming members are configured to transform a wavelength of the light emitted from the first light source to provide the second base substrate with the first light received from the first wavelength transforming member and the second light received from the second wavelength transforming member, and
   wherein the third wavelength transforming member is configured to transform a wavelength of the blue light emitted from the second light source to provide the second base substrate with the third light received from the third wavelength transforming member.

8. The display apparatus of claim 7, wherein the light emitted from the first light source comprises different colors from the first and second lights emitted from the first wavelength transforming member and the second wavelength transforming member, and
   wherein the light emitted from the second light source comprises substantially the same color as the third light emitted from the third wavelength transforming member.

9. The display apparatus of claim 8, wherein the first wavelength transforming member is configured to emit red light, the second wavelength transforming member is configured to emit green light, and the third wavelength transforming member is configured to emit blue light based on the light emitted from the first light source or the light emitted from the second light source.

10. The display apparatus of claim 1, wherein the backlight unit further comprises a light guiding plate comprising:
    a light incident surface to receive the lights generated from the light source part; and
    a light exiting surface to guide the lights exiting from the light guiding plate towards the display panel.

11. The display apparatus of claim 1, wherein the wavelength transforming member comprises at least one material selected from the group consisting of fluorescent material and color transforming material.

12. The display apparatus of claim 1, further comprising an ultraviolet light blocking layer on a second surface of the second base substrate, the second surface of the second base substrate being opposite to the first surface of the second base substrate, and the transflective layer being configured to absorb an ultraviolet light.

13. A method of driving a display apparatus comprising a display panel and a backlight unit, the method comprising:
    time-dividing a frame into a plurality of sub frames comprising a first sub frame, a second sub frame, and a third sub frame;
    time-dividing the received data into first data, second data, and third data corresponding to the sub frames, and providing a data driving part with the first data, the second data, and the third data;

sequentially applying a scan pulse to a plurality of gate lines during a scan period, the scan pulse selecting a horizontal line receiving the time-divided data during each of the sub frames, the sub frames corresponding to a plurality of sub pixels of the display panel, the plurality of sub pixels comprising a first sub pixel, a second sub pixel, and a third sub pixel configured to emit light having different wavelengths;

driving a light shutter member of each of the sub pixels to control light transmittance of the light shutter member;

driving, after the scan period, a first light source of the backlight unit to generate a first light and turning off the second light source during the first sub frame and the second sub frame;

driving, after the scan period, a second light source of the backlight unit to generate a second light and turning off the first light source during the third sub frame;

passing the second light and an ultraviolet light of the first light via a transflective layer; and reflecting, via the transflective layer, red and green light portions of light reflected from inside the display panel, wherein the second light has a different wavelength than the first light.

14. The method of claim 13, wherein the light shutter member comprises a liquid crystal element.

15. The method of claim 13, wherein the light shutter member comprises microelectromechanical systems (MEMS).

16. The method of claim 13, further comprising:
transforming a wavelength of the first light;
providing the transformed first light to the second base substrate;
transforming a wavelength of the second light emitted from the second light source; and
providing the transformed second light to the second base substrate with the second light.

17. The method of claim 16, wherein the first light has different colors to the light emitted from a first wavelength transforming member and a second wavelength transforming member, and
the second light has substantially the same color as the light emitted from a third wavelength transforming member.

18. The method of claim 13,
wherein the first data is applied to the data driving part during the first sub frame to display a first image using the first sub pixel,
wherein the second data is applied to the data driving part during the second sub frame to display a second image using the second sub pixel, and
wherein the third data is applied to the data driving part during the third sub frame to display a third image using the third sub pixel.

19. The method of claim 18, wherein the first data comprises red data, the second data comprises green data, and the third data comprises blue data, and the first image comprises a red image, the second image comprises a green image, and the third image comprises a blue image.

20. The method of claim 18,
wherein the first light comprises a wavelength corresponding to an ultraviolet light, and the second light is a blue light.

21. The method of claim 13, wherein the frame is divided into a first sub frame and a second sub frame, the first data and the second data are applied to the data driving part during the first sub frame to display a mixed image comprising a first image of the first sub pixel and a second image of the second sub pixel, and
the third data is applied to the data driving part during the second sub frame to display a third image using the third sub pixel.

22. The method of claim 21, wherein the first data comprises red data, the second data comprises green data, and the third data comprises blue data, and the first image comprises a red image, the second image comprises a green image, and the third image comprise a blue image.

23. The method of claim 21, wherein the first light source is driven during the first sub frame and the second light source is driven during the second sub frame, and
wherein the first light comprises a wavelength corresponding to an ultraviolet light, and the second light comprises a blue light.

24. The method of claim 21, wherein the first data and the second data are applied to the data driving part through different data buses.

* * * * *